Figure 1:
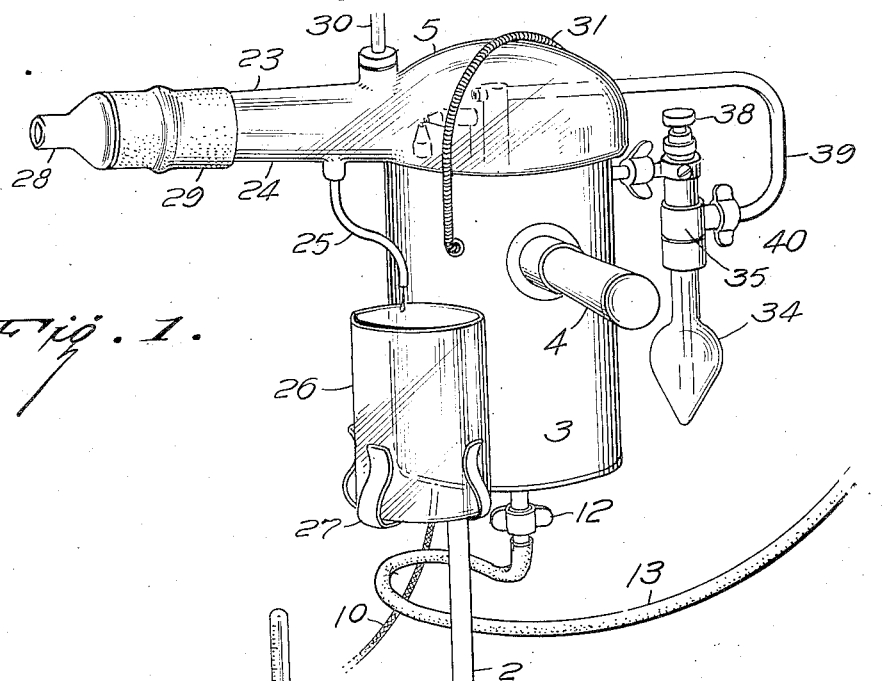
Figure 2:
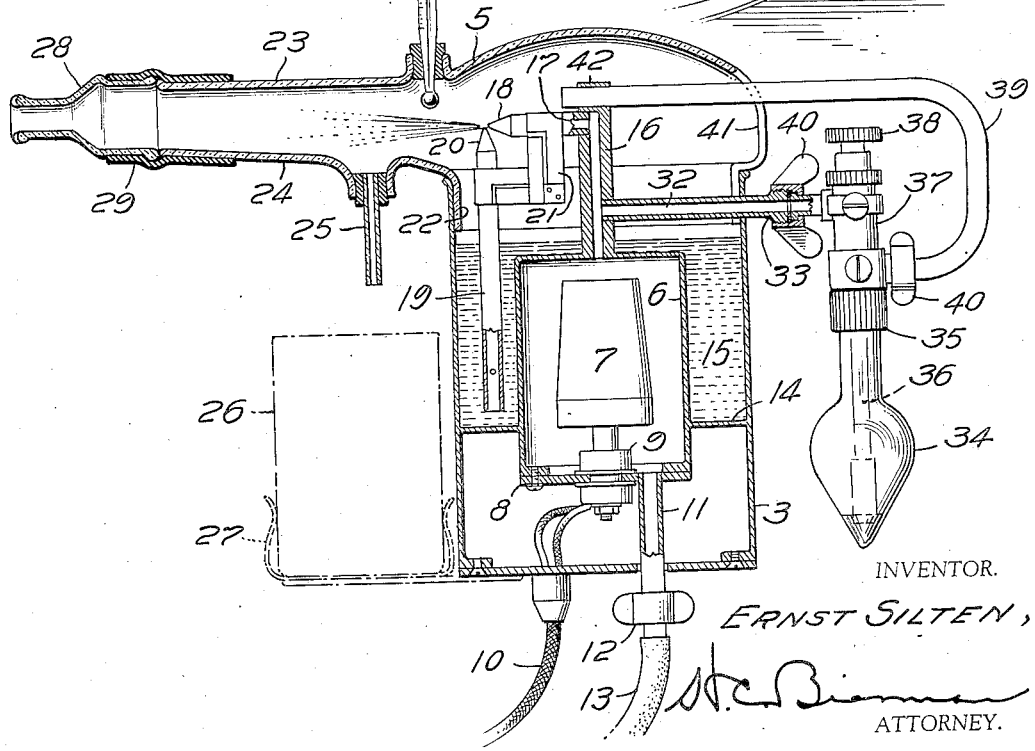

May 12, 1936.   E. SILTEN   2,040,630
VAPORIZATION APPARATUS
Filed Sept. 1, 1934

INVENTOR.
ERNST SILTEN,
ATTORNEY.

Patented May 12, 1936

2,040,630

UNITED STATES PATENT OFFICE 2,040,630

VAPORIZATION APPARATUS

Ernst Silten, Berlin, Germany

Application September 1, 1934, Serial No. 742,432

8 Claims. (Cl. 128—173)

This invention relates to atomizing apparatus, more particularly to an apparatus which is especially adapted for use in atomizing liquids for medicinal purposes.

My invention is intended to be used for atomizing natural waters containing salts and gases dissolved therein. It is also adapted for the atomizing of medicinal liquids of various types and under certain conditions. The salt solution and the medicinal may be atomized together. Means are provided for inhaling the atomized liquids into the mouth or nose. By so doing, various diseases may be treated, and the illness then overcome.

In practicing my invention, I provide an apparatus having means whereby it may be placed on a table or the like, or may be secured to a wall or other object. It consists essentially of a container for the liquid or salt solution which is to be atomized. I provide a shell which is submerged in the liquid and which constitutes at least one wall of the container. The electric heater is placed within the shell, but out of contact therewith. There is provided an inlet for air or other gas, preferably under pressure, into the shell, and an outlet for the air to the atomizing nozzle. In operation, the electric heater warms the liquid to the desired temperature and also heats the air so that the liquid, after being atomized, is at the proper temperature for inhaling.

My new apparatus contemplates also other modifications, additions and variations, both in construction and in operation, all of which will be set forth below.

In the accompanying drawing, constituting a part hereof, and in which like reference characters indicate like parts:

Figure I is a perspective view of one form of apparatus, made in accordance with my invention, and Figure II is a vertical cross-sectional view of said apparatus, some parts being shown in elevation.

As shown in Figure I, the apparatus may be provided with a base, 1, having a rod, 2, extending upwardly and secured to the container, 3. The handle, 4, provides means for readily moving the apparatus and a glass or other cover, 5, fits over the container, 3.

Within the container is a shell, 6, usually of metal, within which is an electric heater of any suitable type, such as a wire resistor. The heater is fixed to the bottom, 8, of the shell by suitable insulating members, 9, and a cable, 10, is attached to a suitable source of electricity. The heater, 7, is out of contact with the shell, 6, in order that the same may not become overheated. The pipe, 11, secured to the bottom, 8, of the shell, is connected by coupling 12, to the hose 13, which in turn is connected with a source of air under pressure.

The bottom, 14, of the container, 3, provides a receptacle for liquid, 15, the surface of which is preferably above the top of the shell, 6. A pipe, 16, connected to the top of the shell is connected with a horizontal pipe, 17, terminating in a nozzle, 18. A pipe, 19, has its lower end projecting to a point near the bottom, 14, and has a nozzle, 20, formed at the upper end to cooperate with 18. Pipes 17 and 19 are held in a bracket, 21, secured in any desired manner to the container 3.

The cover, 5, is provided with a depending portion, 22, which fits into the top of container 3. An extension, 23, of the cover constitutes an exit tube. The bottom, 24, thereof is inclined so as to cause any liquid which is deposited to run down through drip pipe, 25, where the liquid is caught in vessel, 26, held by bracket 27. The mouthpiece, 28, is removably attached to the extension, 23, by means of a sieve, 29, of rubber or the like. A thermometer, 30, is placed between the extension and the cover so as to be visible to the patient. A coil-spring, 31, attached to the container, 3, serves as a means for holding the cover, 5, detachably in the proper position.

In operation, the electric heater is allowed to function to heat the liquid, 15, and the air is caused to flow through hose 13, pipe 11, and over the heater, then through pipe 16, and into the nozzle, 18. This causes liquid to be drawn into pipe, 19, and atomized into extension, 23, through mouthpiece, 28, and into the passages of the throat of the patient.

I generally provide a branch pipe, 32, connected with pipe, 16, the outer end 33, of which is normally closed by a plug. However, it may be desirable to utilize another atomizer device in connection with that described above, or in place thereof.

There is provided a vessel, 34, which is intended to hold a medicinal liquid or the like, which vessel is secured to a threaded ring, 35, and has a tube 36, extending down into the liquid and upwardly into the body, 37, of the atomizer where it communicates with the pipe, 32, to which the atomizer is secured by a wing nut, as shown more clearly in Figure II. A valve within the body, 37, and operated by handle, 38, provides means for regulating the amount of medicinal which is atomized. A tube, 39, is secured by wing nut 40, to the body 37, said tube passing through a slit, 41, in cover, 5, and the end of which is held in opening, 42, which constitutes an extension of pipe 16, thereby the end of tube, 39, is held in position close to the nozzle, 18.

In the operation of this modification, the air causes atomization of liquid, 15, as before, and part of the air passes through pipe, 32, into the vessel, 34, carrying atomized medicinal through pipe 39 and into extension 23, where it mixes with the atomized liquid and this provides two sources of treatment for the patient.

If it is desired to atomize the medicinal alone, then the pipe, 19, which is held by friction in bracket 21, is pushed down a short distance so that there is no longer any drawing up of the liquid by the air in nozzle, 18. In such case, only the air passing through pipe 32 does any atomizing, and the medicinal will pass through the extension 23 to the patient.

Although I have described my invention, setting forth several embodiments thereof, and have described several methods of operation, it is to be understood that many variations are possible in the construction and operation of my invention within the principles set forth. For example; in place of mouthpiece, 23, I may substitute a nosepiece. The drip pipe may be omitted, and the condensed liquid may be caused to flow back into container 3; and the cover 5 may be made of any suitable material and may be secured to the apparatus in different ways than shown. The electric heater may be of the carbon or metal resistor type, and it may be secured to the apparatus in any desired manner. These and other changes will be apparent to those skilled in the art, and my invention is to be broadly construed and not to be limited, except by the claims appended hereto.

What I claim is:

1. Atomizing apparatus comprising a container for liquid, a shell constituting an internal wall of said container, said shell being below the liquid level in said container, an electric heater within said shell, an inlet and an outlet for air in said shell so positioned as to cause air to directly contact with said heater, an atomizing nozzle communicating with said outlet and an exit tube for atomized liquid surrounding said nozzle.

2. Atomizing apparatus comprising a container for liquid, a shell constituting an internal wall of said container, said shell being below the liquid level in said container, an electric heater within said shell, said heater being spaced from the sides and top of said shell to allow circulation of air therebetween, an inlet and an outlet for air in said shell so positioned as to cause air to directly contact with said heater, an atomizing nozzle communicating with said outlet and an exit tube for atomized liquid surrounding said nozzle.

3. Atomizing apparatus comprising a container for liquid, a shell constituting an internal wall of said container, an electric heater within said shell, an inlet and an outlet for air in said shell, an atomizing nozzle in the upper part of said container above the liquid level therein and communicating with said outlet, an exit tube for atomized liquid surrounding said nozzle, and a cover detachably secured to said container to provide access to said nozzle in said container.

4. Atomizing apparatus comprising a container for liquid, a shell constituting an internal wall of said container, an electric heater within said shell, an inlet and an outlet for air in said shell, an atomizing nozzle in the upper part of said container above the liquid level therein and communicating with said outlet, an exit tube for atomized liquid surrounding said nozzle, and a cover detachably secured to said container to provide access to said nozzle in said container, said exit tube constituting part of said cover.

5. Atomizing apparatus comprising a container for liquid, a shell constituting an internal wall of said container, an electric heater within said shell, an inlet and an outlet for air in said shell, an atomizing nozzle communicating with said outlet having a tube for air and a tube extending into said liquid and an exit tube for atomized liquid surrounding said nozzle, said air outlet being directly connected with the air tube of said nozzle.

6. Atomizing apparatus comprising a container for liquid, a shell constituting an internal wall of said container, an electric heater within said shell, an inlet and an outlet for air in said shell, an atomizing nozzle communicating with said outlet and an exit tube for atomized liquid surrounding said nozzle, a by-pass tube for air connected with said outlet, an atomizer connected thereto and means for conducting atomized liquid therefrom into said exit tube.

7. Atomizing apparatus comprising a container for liquid, a shell constituting an internal wall of said container, an electric heater within said shell, an inlet and an outlet for air in said shell, an atomizing nozzle communicating with said outlet and an exit tube for atomized liquid surrounding said nozzle, a by-pass tube for air connected with said outlet, an atomizer connected thereto and means for conducting atomized liquid therefrom in proximity to said nozzle.

8. Atomizing apparatus comprising a container for liquid, a shell constituting an internal wall of said container, an electric heater within said shell, an inlet and an outlet for air in said shell, an atomizing nozzle communicating with said outlet, a cover for said container and nozzle, and an exit tube for atomized liquid surrounding said nozzle, a by-pass tube for air connected with said outlet, an atomizer connected thereto and means for conducting atomized liquid therefrom thru said cover and into said exit tube.

ERNST SILTEN.